United States Patent
Brennan et al.

(10) Patent No.: US 9,918,235 B2
(45) Date of Patent: Mar. 13, 2018

(54) ADAPTIVE ANTENNA OPERATION FOR UAVS USING TERRESTRIAL CELLULAR NETWORKS

(71) Applicant: Verizon Patent and Licensing Inc., Arlington, VA (US)

(72) Inventors: Kevin Gerard Brennan, Metuchen, NJ (US); Taru Jain, Waltham, MA (US); Chandrasekhar Munukutla, Pleasanton, CA (US); Zhongting Shen, Branchburg, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 422 days.

(21) Appl. No.: 14/950,892

(22) Filed: Nov. 24, 2015

(65) Prior Publication Data

US 2017/0150373 A1    May 25, 2017

(51) Int. Cl.

| | |
|---|---|
| *H04W 4/00* | (2009.01) |
| *H04W 16/28* | (2009.01) |
| *H01Q 1/24* | (2006.01) |
| *H04W 4/04* | (2009.01) |
| *H04W 24/08* | (2009.01) |
| *H01Q 1/28* | (2006.01) |
| *H04B 7/185* | (2006.01) |

(52) U.S. Cl.
CPC ............ *H04W 16/28* (2013.01); *H01Q 1/241* (2013.01); *H01Q 1/28* (2013.01); *H04B 7/18506* (2013.01); *H04W 4/04* (2013.01); *H04W 24/08* (2013.01)

(58) Field of Classification Search
CPC .................................................. H04W 16/28
USPC ........................................................ 370/329
See application file for complete search history.

(56) References Cited

U.S. PATENT DOCUMENTS

| | | | |
|---|---|---|---|
| 2014/0333491 A1* | 11/2014 | Behroozi | H01Q 1/1264 343/706 |
| 2017/0059688 A1* | 3/2017 | Gan | G01S 5/0284 |
| 2017/0155456 A1* | 6/2017 | Wennerlof | H04B 17/12 |

* cited by examiner

*Primary Examiner* — Christopher R Crompton

(57) ABSTRACT

A steerable antenna, of a UAV, is used to optimize connectivity to a wireless network, such as to radio access network (RAN) of a cellular wireless network. In one implementation, the altitude of a UAV may be used to determine a direction in which to point the antenna of the UAV. In some implementations, additional factors, such as the travel direction of the UAV and/or the known location of base stations associated with the wireless cellular network, may alternatively or additionally be used to determine the direction of the antenna.

20 Claims, 8 Drawing Sheets

ADAPTIVE ANTENNA OPERATION FOR UAVS USING TERRESTRIAL CELLULAR NETWORKS

BACKGROUND

"Unmanned Aerial Vehicles" (UAVs) (sometimes referred to as "drones," Remotely Piloted Aircraft (RPA), or Unmanned Aerial Systems (UASs)) refer to aircraft without a human pilot aboard. The flight of a UAV may be controlled either autonomously (e.g., by onboard and/or remote computers) or by remote control of a pilot. Proposals for using UAVs include using UAVs for the delivery of payloads (e.g., packages) and remote monitoring and/or sensing (e.g., monitoring of crops or pipelines).

In either autonomous or remote control operation, it may be desirable that the UAV maintain network connectivity to the command and control location (i.e., the physical location of the pilot and/or control processes). From the command and control location, the UAV may receive navigation instructions, emergency instructions (e.g., take evasive action to avoid a collision), or other instructions relating to command and control of the UAV. The UAV may transmit streaming video to the command and control location.

BRIEF DESCRIPTION OF THE DRAWINGS

Embodiments of the present invention will be readily understood by the following detailed description in conjunction with the accompanying drawings. To facilitate this description, like reference numerals may designate like structural elements.

DETAILED DESCRIPTION F PREFERRED EMBODIMENTS

The following detailed description refers to the accompanying drawings. The same reference numbers in different drawings may identify the same or similar elements.

Techniques described herein relate to the use of an steerable antenna, on a UAV, to optimize connectivity to a wireless network, such as to radio access network (RAN) of a cellular wireless network. In one implementation, the current flight direction and altitude of a UAV may be used to determine a direction in which to point the antenna of the UAV. For example, at relatively high altitudes, the antenna of the UAV may be adaptively controlled to have a directional receive pattern that points in the direction of an upcoming base station (i.e., a base station that is "in front" of the UAV or is in the path of the UAV's flight). At low heights, however, such as when the UAV is near the ground, the antenna may be adaptively controlled to operate as an omnidirectional antenna (e.g., to operate as a "standard" antenna that is used by User Equipment (UE) devices of users).

Figure 1:
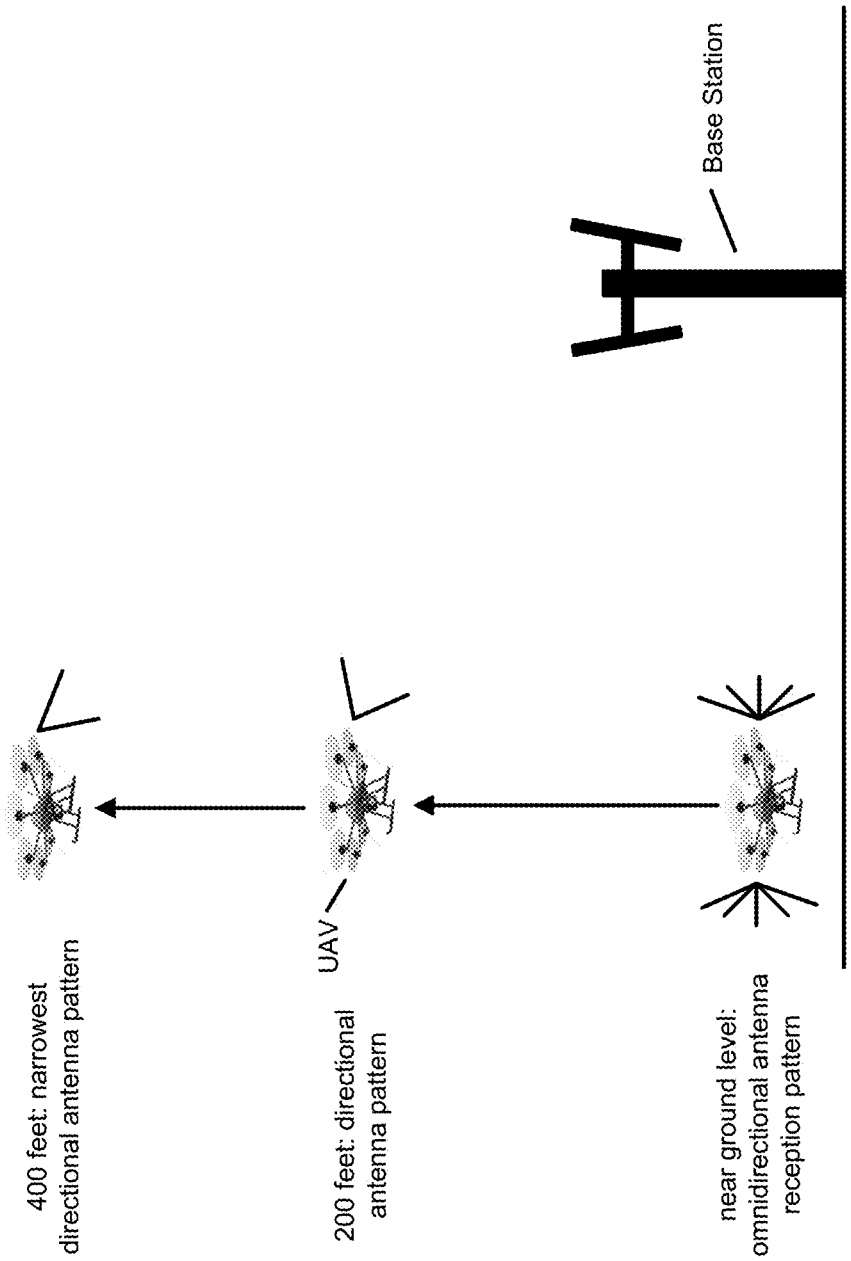
FIG. 1 is a diagram illustrating an example of an overview of concepts described herein.

FIG. 1 is a diagram illustrating an example of an overview of concepts described herein. As shown in FIG. 1, a UAV, during various points of the operation of the UAV, may be flown at different altitudes. The UAV may be controlled through communications with a wireless network, such as a wireless cellular network that uses licensed frequency bands. The wireless network may include a number of base stations that provide wireless network connectivity to a coverage area (a "serving sector") in the vicinity of the base station.

Base stations may use directional antennas that are optimized to serve customers near ground level. For example, the antennas of an antenna tower, associated with a base station, may have a deliberate downward tilt. In spite of this downward tilt, incidental radio signals are still radiated vertically. While radio signals are reduced in strength relative to the main coverage area of the antenna, the clear line of sight and free space conditions at higher elevations (e.g., 400 feet above ground level) may allow for useful communications with UAVs. In fact, in some situations, when flying, UAVs may detect more base station towers than would be detected at ground level. This "polluted" radio environment for the UAV can cause problems during handoff operations and when determining a suitable service sector to which the UAV should attach. For example, reference signals from some of the additional base stations may appear as interference to the UAV. The added interference may create a higher Signal-to-Noise-and-Interference Ratio ("SINR"), which may force the UAV to switch to a lower coding rate and modulation scheme.

Consistent with operations described herein, a UAV may vary the directionality of the antenna associated with the UAV. For example, as shown in FIG. 1, when near ground level, the UAV may receive radio signals using an omnidirectional antenna pattern ("near ground level: omnidirectional antenna reception pattern"). When higher up, such as at 200 feet, the UAV may adaptively control its antenna, such as by the use of beamforming techniques, to point the antenna towards a particular base station or a particular set of base stations ("200 feet: directional antenna pattern". In one implementation, the UAV may use its current direction and altitude to determine the base station to which the UAV should point its antenna. Assume that the UAV continues to gain altitude to 400 feet above ground level ("400 feet: narrowest directional antenna pattern"). As the UAV continues to rise in altitude, the UAV may continue to adaptively change the receive direction of its antenna in order to optimize its connection to the wireless network.

As mentioned, in some implementations, in addition to its current height, the UAV may take into account its direction of travel when adaptively controlling the directional pattern of its antenna. In this situation, the UAV may preferentially focus the antenna towards base stations that are in the direction of the UAV's travel. Advantageously, this may minimize the number of base station handovers required. The base stations in the wireless network are typically stationary, and have static, known locations. In some implementations, the UAV may thus use the known locations of the base stations to further enhance the adaptive control of the directional pattern of the UAVs' antenna.

Figure 2:
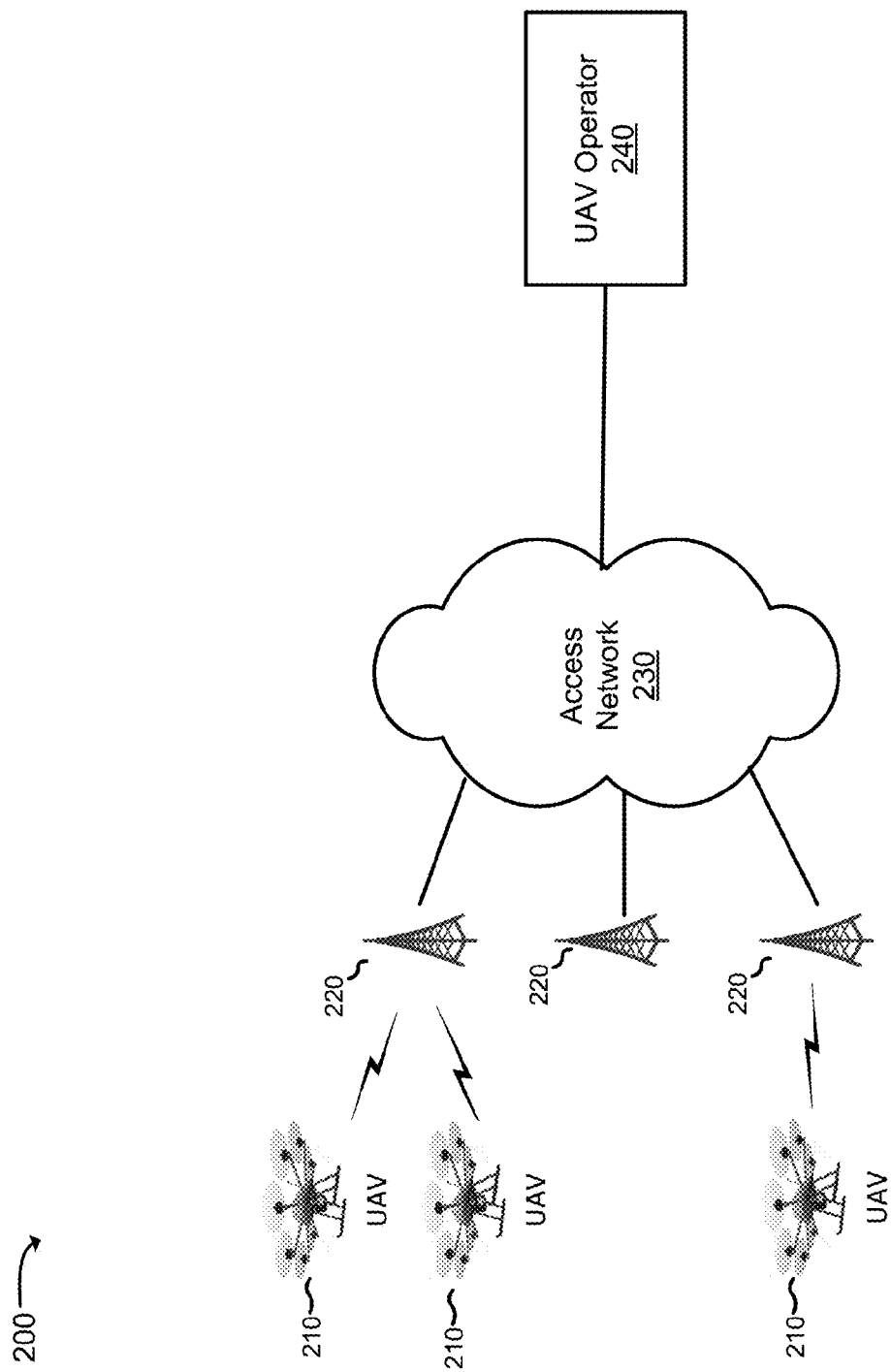
FIG. 2 is a diagram illustrating an example environment in which systems and/or methods described herein may be implemented.

FIG. 2 is a diagram illustrating an example environment 200 in which systems and/or methods described herein may be implemented. As shown, environment 200 may include UAVs 210, base stations 220, access network 230, and UAV operator 240.

UAVs 210 may each include a remotely piloted aerial device, such as a quadcopter or other helicopter-based design, a winged flying device, a blimp, etc. UAV operator 240 may include public or private entities that may use UAVs to deliver payloads or to provide other UAV-based services (e.g., landscape monitoring or photography, agricultural services, etc.). UAVs 210 may each include radio communication equipment (e.g., a UE device) that enables the UAV to wirelessly communicate with a cellular wireless network, such as one implemented by base stations 220 and access network 230.

Base stations 220 may include base stations for a wireless cellular network. Each base station 220 may include one or more radio transceivers to provide wireless connections to mobile devices (such as UAVs 210). The cellular network may be a network that uses licensed frequency bands (i.e., frequency bands in which the operator of the wireless network has obtained permission to use the frequency bands from an appropriate government or regulatory entity). In the context of a Long Term Evolution (LTE) network, base station 220 may be implemented by an Evolved Node B (eNodeB). In the context of a Global System for Mobile (GSM) communications network, base station 220 may be implemented by a base transceiver station (BTS).

Base stations 220 may also include, and/or may be communicatively coupled to, small cells, such as femtocells, microcells, etc. Base stations 220 may generally function to provide an air (radio) interface over a large geographical area. Base stations 220 may be geographically arranged to each provide coverage for a limited geographical area ("cells" or "serving sectors"). UEs, such as a UE that is implemented as part of UAV 210, when moving in and out of the coverage area of particular base stations 220, may be "handed off" to different base stations to receive, from the standpoint of the UE, uninterrupted network coverage.

Access network 230 may represent a network, such as one implemented by the operator of base stations 220, that is used to connect base stations 220 and to provide network management and backhaul functionality. Access network 230 may also provide connectivity to mobile devices, such as UAVs 210, to external servers or networks, such as to UAV operator 240.

In an implementation in which the wireless network includes an LTE-based network, access network 230 may include an evolved packet core (EPC) network that operates based on a third generation partnership project (3GPP) wireless communication standard. The EPC network may include one or more serving gateways (SGWs), mobility management entities (MMEs), and/or packet data network gateways (PGWs).

UAV operator 240 may each represent an operator of one or more UAVs 210. Through wireless communications with the UAVs, UAV operator 240 may monitor and control flight paths taken by UAVs 210 and other operations performed by UAVs 210. Additionally, UAV operator 240 may receive data and video streams from UAVs 210, such as a data or video stream captured by sensors/cameras at the UAV.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200.

Figure 3:
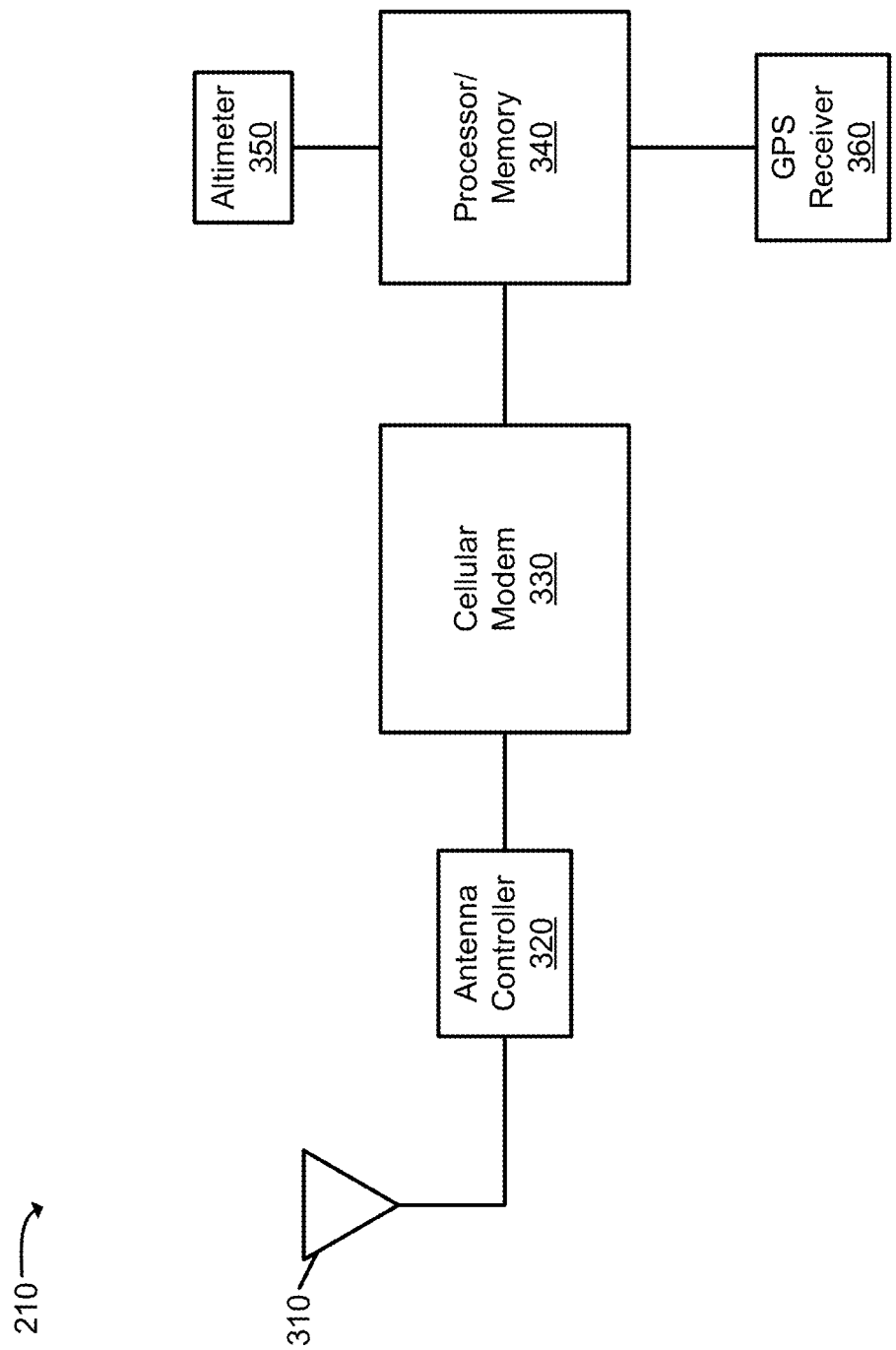
FIG. 3 is a diagram illustrating an example of components of a UAV.

FIG. 3 is a diagram illustrating an example of components of a UAV 210. The components of UAV 210, as shown in FIG. 3, may generally relate to the electronic and/or logic elements of UAV 210 in performing the techniques described herein. As shown in FIG. 3, UAV may include antenna 310, antenna controller 320, cellular model 330, processor/memory 340, altimeter 350, and Global Positioning System (GPS) receiver 360. UAV 210 may include other components that are not shown in FIG. 3, such as batteries, motors, etc.

Antenna 310 may be a directional antenna that is capable of being controlled to radiate or receive greater power in specific directions. Antenna 310 may also be adaptive in that the directionality of antenna 310 can be changed. For example, antenna 310 may be implemented as an antenna can be controllably tilted about one or more axes. Alternatively or additionally, antenna 310 may include an array of fixed antenna elements in which beamforming may be performed to combine the antenna elements in a phased array in such a way that signals at particular angles experience constructive interference while others experience destructive interference. Beamforming is a known technique for changing the directionality of an adaptive antenna.

Antenna controller 320 may include a processor, circuit, or other logic to control antenna 310. For example, when antenna 310 is an antenna array, antenna controller 310 may change the directionality of the array by combining information received at different antenna elements in a way where the expected pattern of radiation is preferentially observed. Antenna controller 320 may control antenna 310 based on antenna directionality information received from processor/memory 340.

Cellular modem 330 may include a modem for use with the cellular wireless network. Cellular modem 330 may particularly represent UE logic associated with an LTE network. Cellular modem 330 may, for example, provide protocol and interface logic for communicating with access network 230.

Processor/memory 340 may represent a processor, microprocessor, or processing logic that may include processing circuitry to interpret and execute instructions that are stored in memory. The memory of processor/memory 340 may include any type of volatile or non-volatile storage device that may store information and instructions for execution by processor 820.

Altimeter 350 may include a meter to measure the altitude of UAV 210. The altitude measurement may be provided to processor/memory 340. For the techniques described herein, the altitude (height) of UAV 210 above ground level may be desired. In some implementations, altimeter 350 may directly generate this value for processor/memory 340. Alternatively or additionally, altimeter 350 may generate a value relative to, for example, sea level, and processor/memory 340, potentially in conjunction with location information from GPS receiver 360, may convert the altitude measurement to an altitude measurement relative to ground level. As used herein, the terms "altitude" and "height" will refer to the altitude/height of UAV 210 relative to ground level and/or relative to the height of nearby base stations 220.

GPS receiver 360 may include a receiver to receive location and timing information from the GPS satellite system. UAV 210 may use GPS receiver 360 to determine the location of UAV 210. In some implementations, other devices may alternatively or additionally be used to determine the location or orientation of UAV 210. For example, UAV 210 may include a gyroscope and/or compass, which may be used to determine the orientation of UAV 210.

Figure 4:
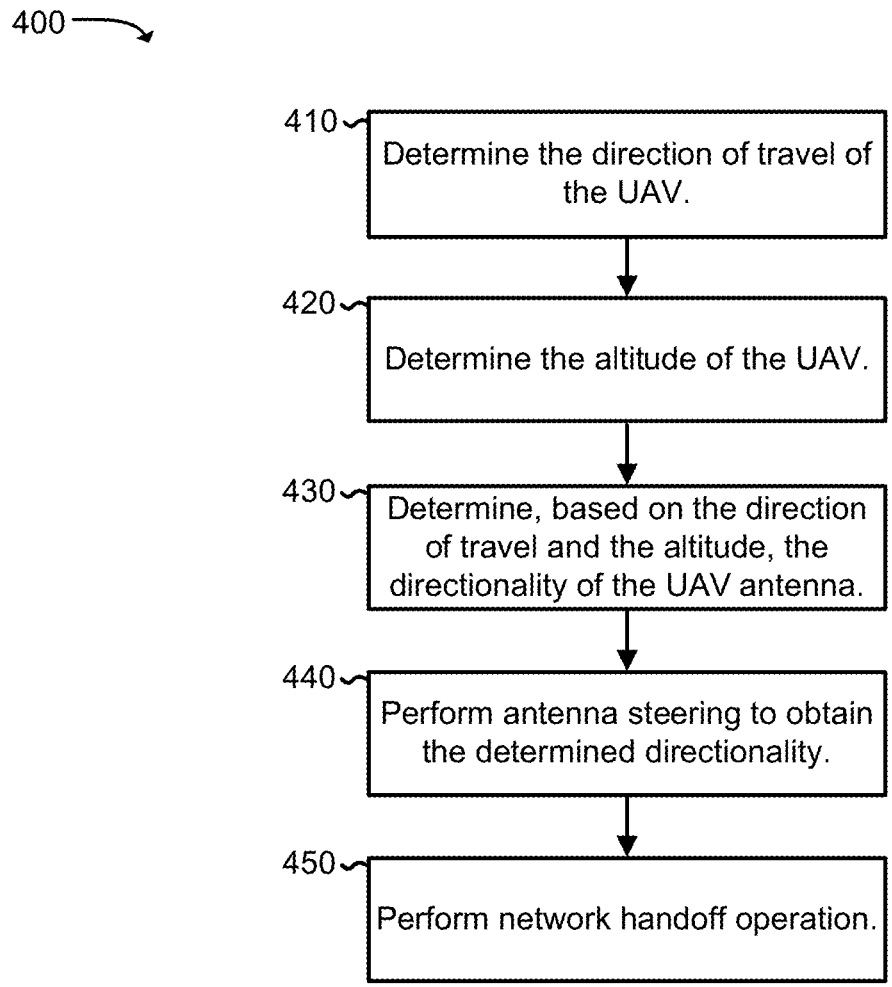
FIG. 4 is a flowchart illustrating an example process for adaptively steering an antenna of the UAV.

FIG. 4 is a flowchart illustrating an example process 400 for adaptively steering the antenna of the UAV. Process 400 may, in some implementations, be implemented by UAV 210.

Process 400 may include determining the direction of travel of the UAV (block 410). The direction of travel may be determined by GPS receiver 360 (or based on signals from GPS receiver 360). Alternatively or additionally, the direction of travel may be determined using a gyroscope, compass, or another sensor. In some implementations, UAV 210 may be programmed with a flight plan that indicates the intended path of UAV 210. The flight plan may also be used to determine the direction or future direction of UAV 210. The "direction" of UAV 210, as used herein, may refer to the direction that best defines the position of UAV at some time in the future. For example, the "direction" of UAV 210 may refer to the line-of-sight direction of UAV 210 that that will take UAV 210 to its location in one minute (or some other time period), even if the actual flight path of UAV 210 may be more erratic.

Process 400 may further include determining the altitude of UAV 210 (block 420). As previously mentioned, altimeter 350 may be used to measure the altitude of UAV 210. Alternatively or additionally, GPS receiver 360 may be used to measure the altitude of UAV 210.

Based on the determined altitude and the direction of travel, the UAV may adaptively control antenna 310. The adaptive control of the antenna may include determining, based on the direction of travel and on the altitude, the desired directionality of the UAV antenna (block 430). In one implementation, the directionality of UAV antenna 310 may be particularly controlled to emphasize receiving radio signals from a particular direction or set of directions (e.g. an angular arc). The directionality may be set in the direction of travel of UAV 210. In this manner, UAV 210 may receive stronger signals from base stations 220 that are "forward looking" (e.g., in the upcoming direction that UAV will travel) with respect to the current location of UAV 210.

In some implementations, the coverage angle of antenna 310 may be based on the altitude of UAV 210. At or near ground level, antenna 310 may be configured, by antenna control 320, as a wide coverage angle antenna. For instance, antenna 310 may be configured as an omnidirectional antenna when at or near ground level. The coverage angle of antenna 310 may be made more narrow as UAV 210 gains altitude. In one implementation, above a certain threshold altitude, antenna 310 may be operated as a directional antenna, and as an omnidirectional antenna when below the threshold altitude.

Process 400 may further include performing antenna steering to obtain the determined directionality (block 440). For example, antenna controller 320 may use beamforming techniques to control individual antenna elements of antenna 310 so that radio signals received from an emitter (e.g., a base station) in the determined direction have the highest gain.

By steering antenna 310 to point in the direction of upcoming travel, UAV 210 may detect, for the purposes of serving sector handoffs, fewer base stations 220, as the received signal strength from base stations to the side of UAV 210 or behind of UAV 210 may be more greatly attenuated (e.g., "weaker") relative to signals from base stations aligned with the direction of antenna 310. This may be particular advantageous at altitudes above buildings (e.g., 200-400 feet), as lack of line-of-sight obstructions at those altitudes may otherwise cause UAV 210 to receive signals from a large number of base stations 220. By limiting the number of detected base stations to those that can be effectively used to implement a network handoff, the reliability of the connection of UAV 210 to the wireless network may be improved. Further, steering antenna 310 may, for signal transmissions to a base station, result in less interference to other users of the network, and can thus improve the signal quality of other users.

Process 400 may further include performing a network handoff operation (block 450). In one implementation, the network handoff operation may be performed using standard UE techniques for a cellular wireless network. In some implementations, based on signal strength measurements (e.g., a SINR, RSRQ Reference Signal Received Power (RSRP) measurements) of the base station to which UAV 210 is currently attached, UAV 210 may determine when a handoff between serving sectors (and neighboring cell(s)) is to be performed. For example, when the RSRQ or RSRP measurement, to the currently attached serving sector, falls below a threshold, a handoff operation between UAV 210 and another serving sector, associated with a higher RSRQ or RSRP measurement, may be initiated.

In some implementations, signal strength measurements associated with the current serving sector, such as RSRQ or RSRP measurements, may additionally be used to dynamically adjust the steering of antenna 310 to improve the signal strength measurements. For instance, antenna 310 and antenna controller 320 may adaptively adjust the steering parameters associated with antenna 310 in order to maximize the signal strength of the signal of the serving sector to which the UAV is currently attached.

In process 400, UAV 210 was as described as steered the UAV's antenna based on factors measured by UAV 210. In some implementations, however, external information, such as information relating to the topology (i.e., the physical arrangement of the network base stations) of the wireless network, may alternatively or additionally be used to steer the antenna.

Figure 5:
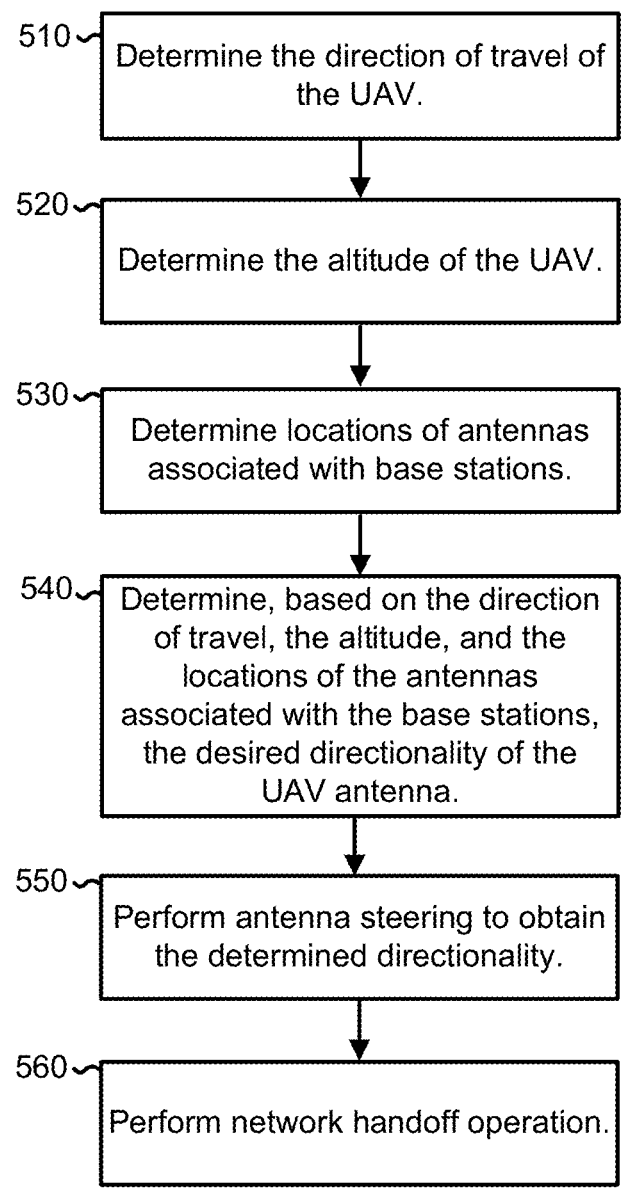
FIG. 5 is a flowchart illustrating an example process for adaptively steering the antenna of the UAV using network topology information.

FIG. 5 is a flowchart illustrating an example process 500 for adaptively steering the antenna of the UAV using network topology information. Process 500 may be implemented by UAV 210, potentially with the assistance of base stations 220 or other network elements (e.g., network elements associated with access network 230). Process 500 may include operations similar to those described with respect to process 400. For brevity, the overlapping operations may not again be described in detail.

Process 500 may include determining the direction of travel of the UAV (block 510) and determining the altitude of the UAV (block 520). Blocks 510 and 520 may be similar to blocks 410 and 420, respectively (FIG. 4).

Process 500 may further include determining the locations of antennas associated with base stations in the cellular wireless network (block 530). Base stations 220, in the network, may generally be stationary. In some implementations, the locations of the antennas, associated with the base stations, may thus be preconfigured in memory of UAV 210. For example, each base station (or service sector), associated with the wireless network, may be identified by a cell identifier value. UAV 210 may include a data structure that stores the physical location of the antennas associated with each of the cell identifiers. Alternatively or additionally, in some implementations, UAV 220 may dynamically receive the locations of the antennas via communications with the cellular wireless network.

Process 500 may further include determining, based on the direction of travel, the altitude, and the locations associated with the base stations, the desired directionality of the UAV antenna (block 540). The desired directionality of antenna 310 may be set to emphasize the receiving radio signals from a particular direction or set of directions (e.g. an angular arc). The directionality may be set based on the direction of travel of UAV 210 and based on the known locations of the antennas associated with the base stations. That is, antenna 310 may be steered to point towards a known location of a base station antenna that is in the direction of travel of UAV 210. The altitude associated with UAV 210 may also be used in determining the desired directionality of antenna 310. For example, the altitude may be used to calculate the downward tilt angle of antenna 310. In some implementations, higher altitudes may generally correspond to a narrower directionality (e.g., a narrower angular arc) for antenna 310.

In some implementations, the direction of travel of the UAV may not be used when determining the desired directionality of the UAV. For instance, instead, the current location of UAV 210, the altitude of UAV 210, and the locations of the nearby base stations, may be used.

Process 500 may further include performing antenna steering to obtain the determined directionality (block 550). For example, antenna controller 320 may use beamforming techniques to control individual antenna elements of antenna 310 so that radio signals received from an emitter in the determined direction have the highest gain.

Process 500 may further include performing a network handoff operation (block 560). In one implementation, the network handoff operation may be performed using standard UE techniques for a cellular wireless network. For example, when the RSRQ or RSRP measurement, to the currently attached serving sector, falls below a threshold, a handover operation between UAV 210 and another neighboring sector, associated with a higher RSRQ or RSRP measurement, may be initiated.

Figure 6A:
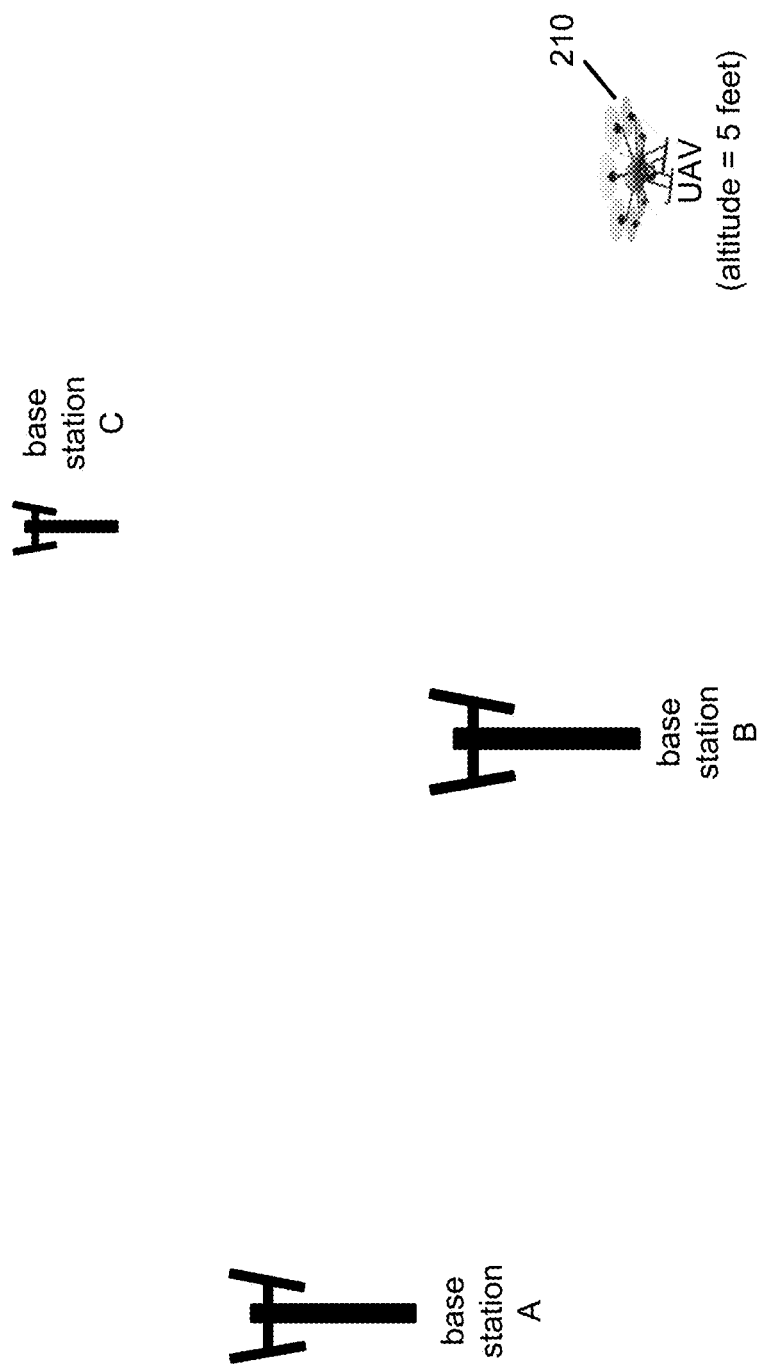
FIGS. 6A and 6B are diagrams illustrating an example application of the adaptive control of the antenna of a UAV.
Figure 6B:
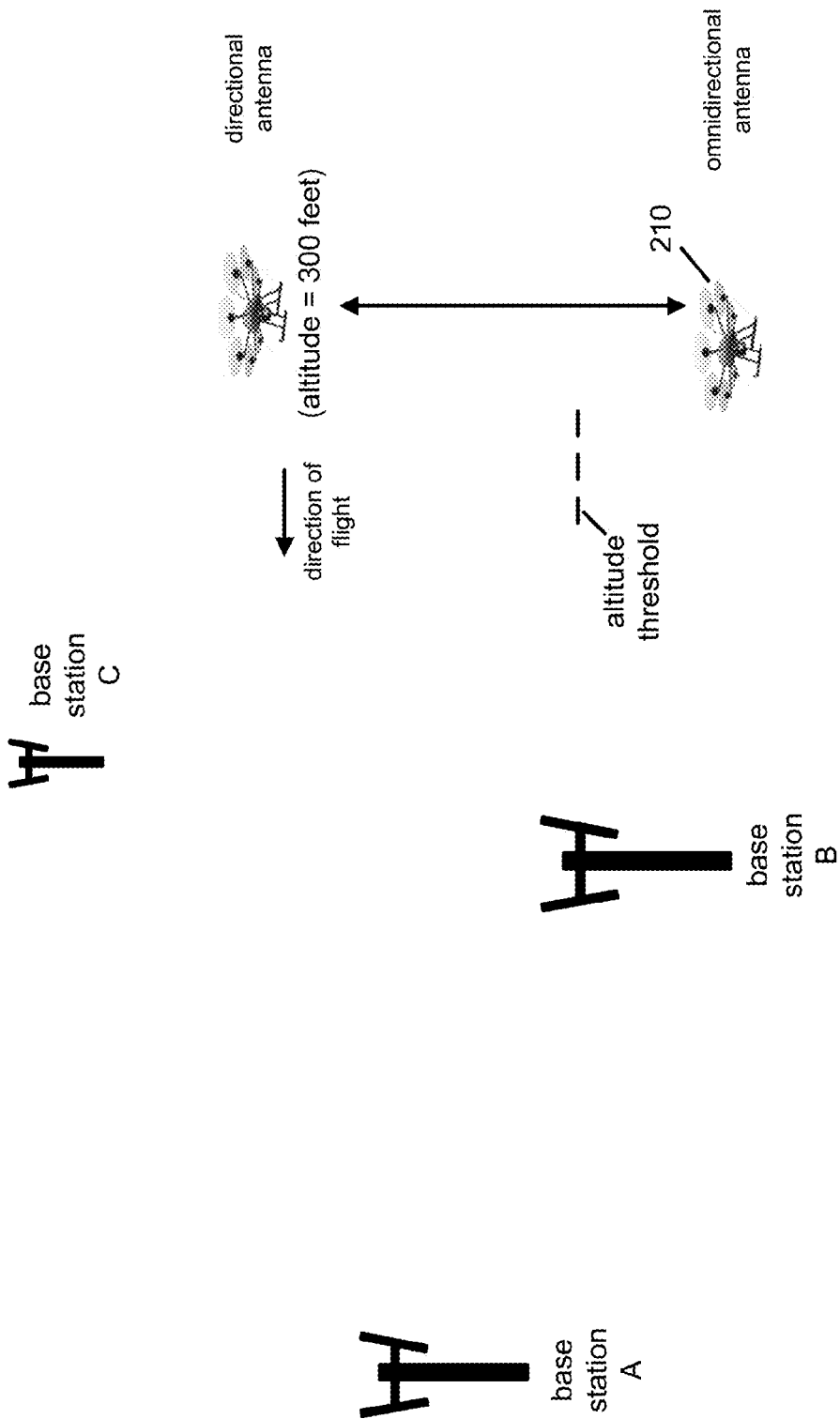

FIGS. 6A and 6B are diagram illustrating an example application of the adaptive control of the antenna of a UAV. In FIGS. 6A and 6B, a number of base station cellular towers, labeled as base stations A, B, and C, are illustrated. Assume that each base station represents a service sector in a wireless cellular network that is to be used to provide network connectivity.

As shown in FIG. 6A, UAV 210 may be flying (or landed) at a relatively low altitude (e.g., 5 feet). The cellular towers of the cellular network may be designed to work, at this altitude, with standard mobile devices (UEs) that use an omnidirectional antenna. Accordingly, antenna 310 of UAV 210 may be operated as an omnidirectional antenna. For instance, based on altitude data received from altimeter 350 and/or GPS receiver 360, processor/memory 340 may instruct cellular modem 330 and/or antenna controller 320 to cause antenna 310 to be configured as an omnidirectional antenna.

As shown in FIG. 6B, assume that UAV 210 begins to fly along a flight path, and subsequently rises to an altitude of 300 feet. The UAV may detect (e.g., by processor/memory 340), based on measurements from altimeter 350 and/or GPS receiver 360, when the UAV crosses above a threshold altitude (e.g., 100 feet). In response, UAV 210 may begin to operate antenna 310 as a directional (non-omnidirectional) antenna. As previously discussed, the direction of antenna 310 may be steered to point to one or more of the base stations. For example, with respect to the operation of process 400, the altitude and traveling direction of UAV 210 may be used to steer antenna 310 to the direction of the UAV or to the direction of a base station that is in the direction of travel of the UAV. With respect to the operation of process 500, network specific information, such as the known locations of base stations A, B, and C, may be additionally used to enhance the steering of antenna 310. The known locations of the base stations may be used to ensure that antenna 310 is steered to a direction that is focused on at least one base station.

Referring to FIG. 6B, assume that the UAV's direction of flight is generally towards base station A and that UAV 210 is currently attached to a service sector associated with base station B. In this situation, the UAV may steer antenna 310 to cover both base stations A and B. As the UAV begins to pass base station B, the received signal strength from base station B may fall below a threshold level, causing a handoff operation to be performed, and causing UAV 210 to attach to base station A. At this point, the UAV may steer antenna 310 to focus on base station A (and potentially on other base stations that are beyond base station A but still in the direction of travel of the UAV). In FIG. 6B, the reception of signals, from base station C, at the UAV, may be minimized during the flight of the UAV. This may correspond to the scenario in which base station C comes into range of the UAV as a peripheral transmitter.

Figure 7:
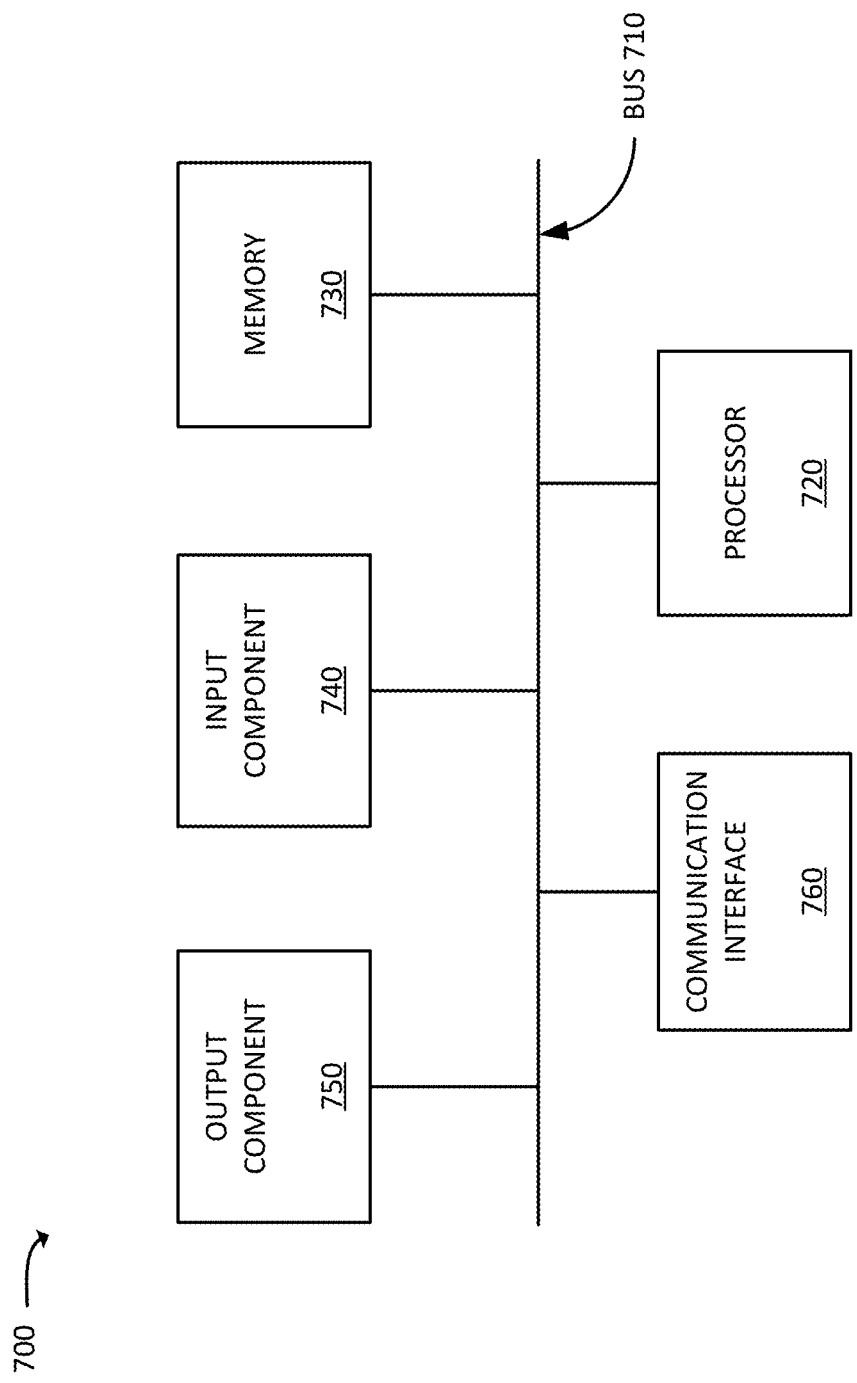
FIG. 7 is a diagram of example components of a device.

FIG. 7 is a diagram of example components of device 700. One or more of the devices described above (e.g., with respect to FIGS. 1, 2, 3, 6A and/or 6B) may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or circuitry that may include processing circuitry to interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes (LEDs), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth radio, a cellular radio transceiver, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks have been described with regard to FIGS. 4 and 5, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. An Unmanned Aerial Vehicle (UAV) comprising:
   an antenna;
   an altimeter to determine an altitude measurement of the UAV;
   a cellular modem to connect to a wireless cellular network; and
   processing logic to:
   determine, based on the altitude measurement, a directionality for the antenna;
   steer the antenna to operate as an omnidirectional antenna when the altitude measurement indicates that the UAV is below a threshold altitude; and
   steer the antenna, when the altitude measurement indicates that the UAV is not below the threshold altitude, to receive radio signals, from the wireless cellular network, in a direction corresponding to the determined directionality.

2. The UAV of claim 1, further comprising:
   a Global Positioning System (GPS) receiver to receive location information corresponding to a location of the UAV;
   wherein the processing logic, when determining the directionality for the antenna, additionally uses the location information to determine the directionality for the antenna.

3. The UAV of claim 1, wherein the processing logic, when determining the directionality for the antenna, is further to:
   determine the directionality based on a travel direction of the UAV.

4. The UAV of claim 3, wherein the directionality is determined to be in the travel direction of the UAV.

5. The UAV of claim 1, wherein the processing logic is further to:
   dynamically adjust, during flight of the UAV, the directionality of the antenna to maximize received signal strength measurements of signals received from one or more base stations, associated with the wireless cellular network, to which the UAV is attached.

6. The UAV of claim 1, wherein the processing logic is further to:
   store known locations of antennas used by base stations in the wireless cellular network, and
   wherein the processing logic, when determining the directionality for the antenna, additionally uses the known locations to determine the directionality for the antenna.

7. The UAV of claim 1, wherein the threshold altitude is approximately 100 feet.

8. A method, implemented by an Unmanned Aerial Vehicle (UAV), comprising:
   determining an altitude of the UAV;

determining, based on the altitude, a directionality for an antenna associated with the UAV;

steering, during flight of the UAV, the antenna to operate as an omnidirectional antenna when the altitude of the UAV is below a threshold altitude; and steering, during flight of the UAV and when the altitude of the UAV is not below the threshold altitude, the antenna of the UAV to a direction corresponding to the determined directionality, to receive radio signals from a wireless cellular network.

9. The method of claim 8, where the UAV includes a Global Positioning System (GPS) receiver to receive location information corresponding to a location of the UAV, and wherein the method further comprises:

determining the directionality by additionally using the location information.

10. The method of claim 8, wherein the method further comprises:

determining a travel direction of the UAV; and determining the directionality, based additionally on, the travel direction of the UAV.

11. The method of claim 10, wherein the directionality is determined to be in the travel direction of the UAV.

12. The method of claim 8, wherein the method further comprises:

dynamically adjusting, during the flight of the UAV, the directionality of the antenna to maximize received signal strength measurements received from base stations, associated with the wireless cellular network, to which the UAV is attached.

13. The method of claim 8, further comprising:

storing known locations of antennas used by base stations in the wireless cellular network, and determining the directionality for the antenna by additionally using the known locations to determine the directionality for the antenna.

14. The method of claim 8, wherein the threshold altitude is approximately 100 feet.

15. An Unmanned Aerial Vehicle (UAV) comprising:

an antenna to communicate with a wireless cellular network;

an altimeter to generate an altitude measurement corresponding to the UAV;

a Global Positioning System (GPS) receiver to receive location information corresponding to a location of the UAV;

one or more processors; and a computer-readable medium to store computing instructions, that when executed by the one or more processors, cause the one or more processors to:

determine, based on the altitude measurement and the location information, a directionality for the antenna, steer the antenna to operate as an omnidirectional antenna when the altitude measurement is below a threshold altitude; and steer the antenna to obtain the determined directionality for the antenna when the altitude measurement is not below the threshold altitude.

16. The UAV of claim 15, wherein the computer-readable medium additionally stores computing instructions, that when executed by the one or more processors, cause the one or more processors to:

determine a current travel direction of the UAV, wherein the determination of the directionality for the antenna is additionally based on the determined travel direction.

17. The UAV of claim 16, wherein the determination of the current travel direction is based on the location information and a flight plan of the UAV.

18. The UAV of claim 15, wherein the computer-readable medium additionally stores computing instructions, that when executed by the one or more processors, cause the one or more processors to:

dynamically adjust, during flight of the UAV, the directionality of the antenna to maximize received signal strength measurements received from base stations, associated with the wireless cellular network, to which the UAV is attached.

19. The UAV of claim 15, wherein the computer-readable medium additionally stores computing instructions, that when executed by the one or more processors, cause the one or more processors to:

store known locations of antennas used by base stations in the wireless cellular network, wherein the determination of the directionality for the antenna additionally uses the known locations to determine the directionality.

20. The UAV of claim 15, wherein the threshold altitude is approximately 100 feet.

\* \* \* \* \*